United States Patent [19]

Triki

[11] 4,172,809
[45] Oct. 30, 1979

[54] ALUMINA, A METHOD FOR ITS PREPARATION AND SAID ALUMINA AS CARRIER CONTAINING CATALYSTS

[75] Inventor: André Triki, Sainte Adresse, France

[73] Assignee: Compagnie Francaise de Raffinage, France

[21] Appl. No.: 919,707

[22] Filed: Jun. 27, 1978

[30] Foreign Application Priority Data

Jul. 29, 1977 [FR] France .................. 77 23407

[51] Int. Cl.$^2$ .................. B01J 21/04; B01J 21/12; B01J 23/24; B01J 23/76
[52] U.S. Cl. .................. 252/455 R; 252/463; 252/464; 252/465; 252/466 J; 252/466 PT; 423/628
[58] Field of Search .................. 252/455 R, 463, 465, 252/464, 466 J, 466 PT; 264/211; 423/628, 630

[56] References Cited

U.S. PATENT DOCUMENTS

| | | | |
|---|---|---|---|
| 2,697,066 | 12/1954 | Sieg | 208/120 |
| 3,242,101 | 3/1966 | Erickson et al. | 252/465 |
| 3,361,526 | 1/1968 | Magee et al. | 423/628 |
| 3,873,470 | 3/1975 | Conway et al. | 252/463 X |
| 3,975,510 | 8/1976 | Leach et al. | 423/630 X |
| 3,993,599 | 11/1976 | Mattox | 252/462 |

FOREIGN PATENT DOCUMENTS 988497 4/1976 Canada.
2156583 1/1973 France.

Primary Examiner—W. J. Shine
Attorney, Agent, or Firm—Curtis, Morris & Safford

[57] ABSTRACT

Process for controlling the porosity of aluminas during the preparation thereof, by forming by extrusion of alumina in the presence of an organic solvent such as an alcohol.

The aluminas so prepared are suitable for use as catalyst or preferably as catalyst carriers.

27 Claims, No Drawings

ALUMINA, A METHOD FOR ITS PREPARATION AND SAID ALUMINA AS CARRIER CONTAINING CATALYSTS

The present invention relates to a process for the preparation of aluminas of controlled porosity. It further relates to the use of aluminas so prepared as catalyst carriers, particularly to catalysts suited for use in processes for the conversion of hydrocarbon charges.

Hereinafter, "aluminas" means compounds which may be formed solely of alumina or which may also contain silica.

Aluminas are widely used in the petroleum, petrochemical and chemical industries, particularly as catalysts, catalyst carriers, or absorbents. In uses of this type, the physical properties of the alumina, such as specific surface, pore volume and pore distribution, are of considerable importance. It is therefore particularly advantageous to be able to influence the physical properties, and especially the porosity, of these aluminas as they are being prepared. The porosity may well be of primary importance by reason of the size of the molecules of the hydrocarbons to be converted, particularly molecules containing sulfur and/or nitrogen, in hydrodesulfurization and hydrodenitrification processes.

With respect to mineral oxides, and particularly aluminas, a person skilled in the art distinguishes between three types of porosity as a function of pore radius (Rp). (Refer to the article by B. C. Lippens in La Chemica e l'Industria, vol. 54, No. 12, p. 1109, Dec. 1972). These are:

Microporosity: $R_p < 10$ Å
Mesoporosity: $10$ Å $< R_p < 500$ Å
Macroporosity: $500$ Å $< R_p$ The pore distribution, which, as mentioned above, is of considerable importance in the various uses of aluminas, is greatly influenced by the process of preparation of the aluminas.

It will be recalled that the processes for the preparation of aluminas comprise the following steps:

(a) Precipitation of an alumina gel from an aluminum salt.
(b) Washing of the gel.
(c) Partial or complete drying of the alumina gel, which may result in a xerogel containing about 60 to 90% by weight of solid matter.
(d) Forming of the alumina, particularly by extrusion, this forming being preceded by rewetting of the alumina when the latter has been dried, until it contains more than about 15% of solid matter.
(e) Calcination.

It has been endeavored to control the distribution of the pores by modifying the operating conditions of these various steps, for example, precipitation or calcination.

Among the many approaches which have been tried, there is the incorporation of polymers into the aluminas prior to calcination, the polymers being eliminated in this last step, the polymers being incorporated during the precipitation of the alumina gel, as described in U.S. Pat. Nos. 2,697,066 or 3,361,526, or then in a xerogel prior to forming, as described in Canadian Pat. No. 988,497. Further, there is the treatment of the alumina gel, prior to drying, with an organic solvent, such as an alcohol, capable of extracting the water (French Pat. No. 2,156,583). Such washing with water would make it possible to orient the distribution of the pores, as described in U.S. Pat. No. 3,993,599, which relates to the preparation of alumina from aluminum halides.

In connection with his work in the area of aluminas preparation, the applicant has found that one step in their preparation, already described briefly in the literature, is of special importance. This is the extrusion of the alumina.

In fact, the applicant has found that extrusion in the presence of an organic solvent, such as an alcohol, of an alumina gel produced from any aluminum salt makes it possible to obtain an alumina of good porosity, in contrast to what is obtained when the extrusion is effected in the presence of water.

When the extrusion of the aluminas is effected conventionally, that is to say, in the presence of water and of a peptizing agent, a modification of the textural properties of these carriers, and particularly a diminution of the mesoporosity, is in fact promoted.

Moreover, the applicant has found that during such extrusion it is possible to incorporate silica in the alumina in a particularly advantageous manner so as to increase the mechanical strength of the alumina without its porosity being affected. The mechanical strength of the aluminas may be of great importance in some of their uses, for example, as catalyst carriers.

One purpose of the present invention thus is to produce aluminas having a controlled porosity.

Another purpose of the invention is to produce aluminas having good mechanical properties in addition to controlled porosity.

The present invention has, as a first preferred embodiment, a process for the preparation of aluminas of controlled porosity, said process comprising (a) precipitation of an alumina gel from a solution of an aluminum salt,
(b) washing of said gel with water, if indicated,
(c) partial or complete drying of the gel,
(d) rewetting of the alumina, if indicated,
(e) forming by extrusion of the possibly rewetted alumina, and
(f) calcination of the extrudates obtained, said process being characterized in that the extrusion of the alumina is effected in the presence of an organic solvent.

A second preferred embodiment of the present invention is a process for the preparation of aluminas as described above, said process being further characterized in that there is incorporated in the alumina, during the extrusion, a silicon compound which is then converted to silica.

A further preferred embodiment of the present invention is the use of aluminas prepared in accordance with the invention in making catalysts suitable for use in hydrocarbon conversion processes.

Still other preferred embodiments of the present invention are hydrocarbon conversion processes employing catalysts prepared in accordance with the invention.

The first step of the process in accordance with the invention consists of the precipitation of an alumina gel from an aluminum salt in a water or alcohol solution.

The gel may be obtained, for example, by hydrolysis of an aluminum alcoholate, such as an aluminum butylate;
by treatment of an aluminum salt with a base, the aluminum salt being, for example, aluminum sulfate, aluminum chloride or aluminum nitrate, and the base, ammonia, by treatment of an alkaline aluminate with an acid or with an aluminum salt such as the sulfate, the chloride or the nitrate of aluminum.

It is preferable during the precipitation of the gel to operate with vigorous agitation in order that a homogeneous product may be obtained. After precipitation, the gel may be allowed to mature. The maturing of the gel may be accelerated by raising the temperature. The gel may then be washed with water, if indicated, depending on the nature of the reactants employed.

The gel is then filtered and, if desired, washed with a solvent capable of removing the water from the gel. The solvent may be an alcohol or a ketone, for example, and, in general, a solvent capable of forming an azeotrope with water.

The alumina must then be extruded. For this extrusion, the alumina must be in the form of a paste sufficiently thick not to be deformed after passing through a die.

The gel should therefore be partially dried at a temperature approximately between 40° and 140° C. so that it contains not less than about 15% by weight of solid matter. Such drying may be continued until a xerogel is obtained. Typically, the xerogel would contain about 60 to 90% by weight of solid matter.

The gel may also be calcined at a temperature of 300° C. or higher to give a dehydrated alumina.

In some cases, the alumina will then have to be rewetted with a liquid to make a sufficiently thick paste.

Regardless of the percentage of solid matter contained in the alumina at the time of extrusion, it is necessary in the process in accordance with the invention that the extrusion be effected in the presence of an organic solvent, which may, for example, be an alcohol such as methanol, ethanol, the propanols or the butanols.

In the case of an alcohol, the quantity of alcohol contained in the alumina upon extrusion may be 20 wt. % or more, and preferably 50 wt. % or more, based on the weight of the solid matter.

The organic solvent may be introduced into the gel at the time of precipitation or at the time the gel is washed, after precipitation and filtration, or at the time the alumina is rewetted, if indicated.

After extrusion, the alumina is calcined at a temperature of 300° or higher.

With a view to increasing the mechanical strength of the aluminas prepared by the process in accordance with the invention, silica may be incorporated in it.

This addition is made at the time of extrusion. The silica is incorporated in the form of a silicon compound which is then converted to silica. This compound may be tetraethyl orthosilicate in solution in an organic solvent such as an alcohol. In this case, the silicon compound is converted to sillica during the final calcination.

The process in accordance with the invention permits preparing aluminas having the following properties:
 Specific surface—between 100 and 450 m$^2$/g
 Pore volume—between 0.2 and 3 cc/g The pore volume is distributed practically in its entirety among pores whose radius is comprised between 10 and 150 Å, in other words, in the mesoporosity range, as will be shown in the examples illustrating the invention.

The aluminas prepared by the process in accordance with the invention may be used as catalysts. They may also be used as carriers for the preparation of catalysts. When used as catalyst carriers, it is necessary to deposit on the alumina at least one active phase containing at least one metal from groups III to VIII of the periodic table of the elements. The active phase or phases may be deposited on the carrier by the technique of impregnating the carrier with at least one solution containing at least one metal from groups III to VIII of the periodic table, either as an anion or as a cation. In this impregnation, the impregnating solution should be an organic solution, for example, an alcohol solution containing at least 20% by weight of alcohol.

The compounds containing the active phases must, of course, be soluble in the organic solution.

The solid obtained after deposition of the active phase or phases may be dried at between 70° and 140° C. It is then calcined at a temperature which depends on the active phase or phases deposited.

These aluminas may be used to make hydrodesulfurization catalysts, for example, the active phases then being metals from groups VIII and VIB of the periodic table of the elements. The percentage of the metals so deposited on the carrier may range approximately from 0.2 to 40 wt. %, based on the total catalyst mass. When the metals deposited are cobalt and molybdenum, the cobalt content should be between 0.2 and 10 wt. %, and preferably between 1 and 6 wt. %, and the molybdenum content between 2 and 40 wt. %, and preferably between 7 and 20 wt. %.

The catalytic formulations so obtained may be used in processes for the desulfurization of hydrocarbon fractions, particularly fractions obtained in the distillation of crude petroleum, such as atmospheric gas oil, vacuum gas-oils, fuel oils, and vacuum residues.

Before the operation of desulfurization of hydrocarbons, it may be advantageous to presulfurize these catalysts by known processes. Generally, after applying hydrogen pressure between 50 and 200 bars, the temperature is raised to about 350° to 400° C. as compounds capable of liberating sulfur, such as mixtures of hydrogen and hydrogen sulfide, mercaptans or carbon sulfide, or even a sulfurous gas oil, are passed over the catalyst.

This operation is performed in the presence of hydrogen. The hydrocarbons to be desulfurized usually will be in the liquid phase, and the reaction conditions are as follows: Temperature between 300° and 500° C., and pressure between 30 and 180 bars. The volume ratio of hydrogen to hydrocarbons ranges from 100 to 1,000 standard liters per liter, and the space velocity of the charge, measured in the liquid state, is preferably between 0.1 and 5.

The catalysts in accordance with the invention are not, of course, limited to the hydrodesulfurization of hydrocarbon fractions but may be employed in many other types of reactions, depending on the nature of their active phase, and in general particularly in processes for the conversion of hydrocarbon charges.

The examples which follow illustrate the preparation and properties of the aluminas prepared in accordance with the invention. They also illustrate the making from such aluminas of catalysts suited for use in the conversion of hydrocarbons and their use in the hydrodesulfurization of hydrocarbon fractions. These examples are not, of course, limitative.

EXAMPLE 1

This example relates to the preparation of control aluminas TA1, TA2, TB1, TB2, TD1 and TF1;

aluminas A1, A2, A3, A4, A5, A6, A7, A8, A9, A10, A11, A12, B1, B2, B3, B4, C1 and C2 in accordance with the invention and contaning no silica; and aluminas D1, D2, D3, D4, D5, D6, D7, D8, E1, E2 and F1 in accordance with the invention and containing silica.

(1) Aluminas TA1, TA2 A1, A2, A3, A4, A5, A6, A7, A8, A9, A10, A11 and A12

(a) Preparation of control alumina TA1

7.04 l of an aqueous solution of sodium aluminate containing 204 g of sodium aluminate is added with vigorous agitation to 0.6 l of an aqueous solution of aluminum chloride containing 200 g of aluminum chloride.

The gel obtained is filtered, washed with water and then with acetone. The gel is then dried for 16 hr. at 120° C. A xerogel is thus obtained.

This xerogel is calcined for 2 hr. at 600° C. In this way, a powdered alumina is obtained, and this is the control alumina TA1.

(b) Preparation of control alumina TA2

This alumina is prepared in the same manner as the alumina TA1 up to the point where a xerogel is obtained.

76 g of the xerogel obtained is then rewetted with 123 cc of an aqueous solution of nitric acid containing 1 cc of nitric acid at 63% by weight. The alumina is extruded and then calcined for 2 hr at 600° C. Thus the control alumina TA2 is obtained.

(c) Preparation of aluminas A1, A2, A3, A4, A5, A6, A7, A8, A9, A10, A11 and A12

These aluminas are prepared in the same manner as the alumina TA1 up to the point where a xerogel is obtained.

This xerogel is rewetted with an aqueous solution of ethanol of varied concentration and of nitric acid at 63% by weight. The aluminas are then extruded and the extrudates are calcined for 2 hr at 600° C. Thus the aluminas A1, A2, A3, A4, A5, A6, A7, A8, A9, A10, A11 and A12 are obtained.

(d) Properties of aluminas

These properties have been determined by the BET and BJH methods, as have those of all the aluminas described further on.

Table 1 below gives, for the aluminas TA1, TA2, A1, A2, A3, A4, A5, A6, A7, A8, A9, A10, A11 and A12, the quantities of water, alcohol and nitric acid used to rewet the xerogels before their extrusion, the weights of the rewetted xerogels, the specific surface, pore volume and maximum pore radius of the aluminas, as well as the distribution of the pore volume.

Table 1 also gives the crushing strength of some of the aluminas prepared. The crushing-strength test consists in measuring the force which must be exerted on 20 cc of catalyst to obtain 0.5% of its weight in fine particles. A force of 10 kg/cm$^2$ is considered a good result.

It is apparent from Table 1 that:

1. Extrusion in the presence of water strongly inhibits porosity in the calcined powder.
2. The gradual addition of alcohol to the water used in rewetting promotes the development of the surface and of the pore volume. Table 1 permits comparison of the properties of the alumina TA2 with those of the aluminas A1, A3 and A5.
3. The mesoporosity increases progressively as the quantity of alcohol is increased.

TABLE 1

| | ALUMINA | TA1 | TA2 | A1 | A2 | A3 | A4 | A5 | A6 | A7 | A8 | A9 | A10 | A11 | A12 |
|---|---|---|---|---|---|---|---|---|---|---|---|---|---|---|---|
| Re-wet-ting | Weight of xerogel (g) | No ex-tru-sion | 76 | 76 | 38 | 76 | 38 | 38 | 38 | 38 | 38 | 38 | 38 | 38 | 38 |
| | Alcohol solution Volume of water (cc) | | 123 | 105 | 69 | 177 | 57 | 81 | 54 | 48 | 7.2 | 0 | 0 | 0 | 0 |
| | Volume of alcohol (cc) | | 0 | 35 | 23 | 59 | 19 | 27 | 18 | 16 | 64.8 | 126 | 118 | 99 | 94 |
| | Percent of alcohol by volume | | 0 | 25 | 25 | 50 | 50 | 75 | 75 | 75 | 90 | 100 | 100 | 100 | 100 |
| | Volume of nitric acid (cc) | | 1 | 1 | 2 | 1.5 | 2.2 | 2.2 | 4.4 | 4.4 | 6.6 | 1.1 | 2.2 | 3.3 | 6.6 |
| Properties of Aluminas | Surface (m$^2$/g) | 313 | 243 | 279 | 248 | 302 | 318 | 311 | 301 | 275 | 246 | 370 | 301 | 274 | 290 |
| | Pore volume (cc/g) | 2.56 | 0.62 | 0.72 | 0.52 | 0.70 | 0.82 | 1.53 | 0.75 | 0.95 | 0.97 | 1.8 | 2.5 | 1.6 | 0.70 |
| | Mode of distribution of pore radius (Å)* | 135 | 40 | 39 | 30 | 35 | 30–45 | 59–76 | 30–44 | 39–51 | 72 | 110–200 | 95–107 | 76–106 | 33 |
| | Crushing strength (kg/cm$^2$) | | | | | | 4.0 | | 2.3 | | | 1.2 | | 9.4 | 7.8 |
| | Distribution of pore volume (%) Pore radius (Å): | | | | | | | | | | | | | | |
| | ≦ 10 | 0 | 0 | 0 | 0 | 0 | 0 | 0 | 0 | 0 | 0 | 0 | 0 | 0 | 0 |
| | 11 to 20 | 8.0 | 12.1 | 26.7 | 32.3 | 4.2 | 17.8 | 6.3 | 20.0 | 11.0 | 12.6 | 0.2 | 3.4 | 5.4 | 3.7 |
| | 20 to 30 | 3.1 | 17.0 | 19.3 | 39.3 | 33.0 | 21.7 | 6.7 | 28.4 | 14.5 | 9.2 | 3.7 | 3.0 | 4.2 | 46.2 |
| | 30 to 40 | 2.7 | 53.5 | 38.5 | 26.0 | 59.2 | 24.5 | 8.4 | 27.7 | 22.3 | 6.4 | 3.0 | 3.1 | 4.0 | 41.5 |
| | 40 to 50 | 2.8 | 16.8 | 10.0 | 1.6 | 0.7 | 21.5 | 11.4 | 18.0 | 23.6 | 6.1 | 4.0 | 4.0 | 5.4 | 4.9 |
| | 50 to 60 | 3.8 | 0.2 | 2.2 | 0.4 | 1.0 | 8.5 | 1.52 | 2.6 | 20.1 | 7.7 | 4.4 | 5.2 | 7.5 | 1.4 |
| | 60 to 70 | 4.8 | 0.2 | 2.4 | 0.2 | 0.5 | 2.9 | 12.8 | 1.3 | 4.7 | 9.2 | 5.1 | 5.9 | 8.1 | 0.7 |
| | 70 to 80 | 5.8 | 0.1 | 0.7 | 0.2 | 0.5 | 1.2 | 13.3 | 0.9 | 1.5 | 9.9 | 6.2 | 8.1 | 10.5 | 0.3 |
| | 80 to 90 | 9.7 | 0.1 | 0.1 | 0 | 0.4 | 0.3 | 11.3 | 1.1 | 1.2 | 8.9 | 5.9 | 8.6 | 9.9 | 0.3 |
| | 90 to 100 | 7.7 | 0 | 0.1 | 0 | 0.2 | 0.3 | 6.3 | 0 | 0.8 | 7.9 | 5.7 | 12.2 | 8.9 | 0.2 |
| | 100 to 110 | 11.3 | 0 | 0 | 0 | 0.2 | 0.3 | 3.0 | 0 | 0.3 | 6.7 | 6.9 | 10.6 | 10.0 | 0.2 |
| | 110 to 120 | 11.7 | 0 | 0 | 0 | 0.1 | 0.3 | 1.1 | 0 | 0 | 5.3 | 6.9 | 9.9 | 6.5 | 0.2 |
| | 120 to 130 | 8.9 | 0 | 0 | 0 | 0 | 0.3 | 1.1 | 0 | 0 | 3.6 | 5.4 | 6.9 | 6.8 | 0.1 |
| | 130 to 140 | 15.5 | 0 | 0 | 0 | 0 | 0.2 | 0.9 | 0 | 0 | 2.7 | 5.8 | 5.8 | 4.3 | 0.1 |
| | 140 to 150 | 4.2 | 0 | 0 | 0 | 0 | 0.2 | 0.7 | 0 | 0 | 2.0 | 6.5 | 4.8 | 2.8 | 0.1 |
| | ≧ 150 | 0 | 0 | 0 | 0 | 0 | 0 | 1.5 | 0 | 0 | 1.8 | 27.3 | 8.5 | 5.7 | 0.1 |

*Maximum of pore-radius distribution curve (2) Aluminas TB1, TB2, B1, B2, B3 and B4

(a) Preparation of control alumina TB1

Four liters of an aqueous solution of aluminum nitrate containing 1,500 g of aluminum nitrate is added with vigorous agitation to 1,260 cc of an aqueous ammonia solution at 22 wt. %.

The gel obtained is allowed to mature for 24 hr. whereupon it is washed and dried for 16 hr at 120° C. A xerogel is thus obtained.

This xerogel is calcined for 2 hr at 600° C. A powdered alumina is thus obtained, and this is the control alumina TB1.

(b) Preparation of control alumina TB2

This alumina is prepared in the same manner as the alumina TB1 up to the point where a xerogel is obtained.

15 g of the xerogel obtained is then rewetted with 20.3 cc of an aqueous solution of nitric acid containing 0.3 cc of nitric acid at 63 wt. %. The alumina is extruded and then calcined for 2 hr at 600° C. In this way the control alumina TB2 is obtained.

(c) Preparation of aluminas B1, B2, B3 and B4

These alumina are prepared in the same manner as the alumina TB1 up to the point where a xerogel is obtained.

This xerogel is rewetted with alcohol, possibly in aqueous solution, and with nitric acid. The aluminas are extruded and the extrudates are calcined for 2 hr at 600° C. In this way the aluminas B1, B2, B3 and B4 are obtained.

(d) Properties of aluminas TB1, TB2, B1, B2, B3, B4

Table 2 which follows gives, for the aluminas TB1, TB2, B1, B2, B3 and B4, the quantities of water, alcohol and nitric acid used to rewet the xerogels before their extrusion, the weights of the rewetted xerogels, the specific surface, pore volume and maximum pore radius of the aluminas, as well as the distribution of the pore volume.

The favorable effect on the mesoporosity of extrusion in alcohol is apparent.

TABLE 2

| | ALUMINA | TB1 | TB2 | B1 | B2 | B3 | B4 |
|---|---|---|---|---|---|---|---|
| Re-wetting | Weight of xerogel (g) | No extrusion | 15 | 20 | 20 | 22 | 20 |
| | Alcohol solution — Volume of water (cc) | | 20 | 12 | 7 | 4 | 0 |
| | Volume of alcohol (cc) | | 0 | 4 | 7 | 12 | 24 |
| | Percent of alcohol by volume | | 0 | 25 | 50 | 75 | 100 |
| | Volume of nitric acid (cc) | | 0.3 | 0.6 | 1.1 | 1.1 | 1.6 |
| Properties of aluminas | Surface (m²/g) | 262 | 240 | 286 | 308 | 297 | 343 |
| | Pore volume (cc/g) | 1.35 | 0.80 | 1.08 | 1.24 | 1.26 | 1.20 |
| | Mode of distribution of pore radius (Å) | 106 | 61 | 30 | 30–101 | 35–76 | 76 |
| | Distribution of pore volume (%) Pore radius (Å): | | | | | | |
| | ≤ 10 | 0 | 0 | 0 | 0 | 0 | 0 |
| | 11 to 20 | | 12.7 | 18.3 | 8.1 | 14.0 | 3.6 | 9.3 |
| | 20 to 30 | 7.4 | 9.5 | 12.0 | 9.8 | 10.9 | 7.4 |
| | 30 to 40 | 6.7 | 12.6 | 12.9 | 9.7 | 12.3 | 9.8 |
| | 40 to 50 | 4.9 | 11.9 | 8.0 | 6.9 | 7.9 | 9.2 |
| | 50 to 60 | 4.5 | 11.8 | 6.5 | 6.3 | 6.9 | 8.7 |
| | 60 to 70 | 5.3 | 9.5 | 6.7 | 7.0 | 7.0 | 9.4 |
| | 70 to 80 | 6.4 | 5.4 | 5.3 | 7.2 | 7.7 | 10.2 |
| | 80 to 90 | 6.6 | 6.4 | 4.1 | 6.9 | 10.0 | 9.3 |
| | 90 to 100 | 8.0 | 5.7 | 4.2 | 8.3 | 10.8 | 8.1 |
| | 100 to 110 | 11.1 | 3.4 | 4.3 | 8.0 | 8.0 | 7.4 |
| | 110 to 120 | 6.8 | 2.3 | 4.4 | 5.8 | 6.0 | 6.2 |
| | 120 to 130 | 4.8 | 1.7 | 4.3 | 3.8 | 6.3 | 3.9 |
| | 130 to 140 | 3.9 | 1.1 | 4.3 | 2.3 | 1.9 | 1.1 |
| | 140 to 150 | 3.4 | 0.4 | 4.2 | 1.7 | 0.5 | 0 |
| | ≧ 150 | 7.5 | 0 | 10.7 | 2.3 | 0.2 | 0 |

(3) Aluminas C1 and C2

5.1 l of an aqueous solution of aluminum chloride containing 645 g of aluminum chloride is added with vigorous agitation to 800 cc of an aqueous 20% solution of ammonia.

In the case of C2, the gel is allowed to mature for 24 hr. In the case of C1, the gel is not allowed to mature.

The gel is then washed with acetone. Then the gel is dried for 16 hr at 120° C. A xerogel is thus obtained.

The xerogel is rewetted with alcohol, then extruded and calcined for 2 hr at 600° C.

Table 3 which follows gives the rewetting conditions and properties of the aluminas C1 and C2.

TABLE 3

| | ALUMINAS | C1 | C2 |
|---|---|---|---|
| Rewetting | Weight of xerogel (g) | 40 | 60 |
| | Volume of alcohol (cc) | 110 | 120 |
| Properties of aluminas | Surface (m²/g) | 401 | 339 |
| | Pore volume (cc/g) | 1.21 | 0.83 |
| | Mode of distribution of pore radius (Å) | 43–58 | 46–66 |
| | Distribution of pore volume (%) Pore radius (Å): | | |
| | ≤ 10 | 0 | 0 |
| | 11 to 20 | 7.1 | 9.2 |
| | 20 to 30 | 6.3 | 9.0 |
| | 30 to 40 | 13.0 | 10.8 |
| | 40 to 50 | 19.8 | 15.3 |
| | 50 to 60 | 43.9 | 13.1 |
| | 60 to 70 | 1.2 | 15.4 |
| | 70 to 80 | 3.0 | 10.5 |
| | 80 to 90 | 1.9 | 7.2 |
| | 90 to 100 | 0.8 | 3.3 |
| | 100 to 110 | 0.7 | 2.2 |
| | 110 to 120 | 0.6 | 1.4 |
| | 120 to 130 | 0.6 | 0.9 |

TABLE 3-continued

| ALUMINAS | C1 | C2 |
|---|---|---|
| 130 to 140 | 0.4 | 0.8 |
| 140 to 150 | 0.3 | 0.9 |
| ≧ 150 | 0.4 | 0 |

(4) Aluminas TD1, D1, D2, D3, D4, D5, D6, D7 and D8

These aluminas are prepared in the same manner as the alumina TA1 up to the point where a xerogel is obtained.

A certain quantity of the xerogel is then rewetted with water in the case of TD1 and with alcohol possibly in the presence of nitric acid, in the case of D1, D2, D3, D4, D5, D6, D7 and D8.

During such rewetting, tetraethyl orthosilicate is introduced into the xerogel with alcohol or water. The aluminas are then extruded and the extrudates are calcined for 2 hr at 600° C. In this way the aluminas D1, D2, D3, D4, D5, D6, D7, D8 and TD1 are obtained.

Table 4 which follows gives, for the aluminas D1, D2, D3, D4, D5, D6, D7 and TD1 the quantities of the xerogels and of the alcohol, nitric acid and tetraethyl orthosilicate used to rewet the xerogels, the specific surface, pore volume and maximum pore radius, the percentage of silica in the aluminas and the mechanical strength of the aluminas as well as the distribution of the pore volume.

TABLE 4

| | ALUMINA | TD1 | D1 | D2 | D3 | D4 | D5 | D6 | D7 | D8 |
|---|---|---|---|---|---|---|---|---|---|---|
| Re-Wetting | Weight of xerogel (g) | 40 | 160 | 40 | 40 | 20 | 20 | 20 | 20 | 50 |
| | Weight of tetraethyl orthosilicate (g) | 4.85 | 12.6 | 5.1 | 10.2 | 2.55 | 5.1 | 10.2 | 20.4 | 6.87 |
| | Volume of alcohol (cc) | 0 | 360 | 90 | 80 | 52 | 42 | 35 | 25 | 143 |
| | Volume of nitric acid (cc) | 0 | 14 | 3.5 | 3.5 | 0 | 0 | 0 | 0 | 0 |
| | Volume of water (cc) | 59 | 0 | 0 | 0 | 0 | 0 | 0 | 0 | 0 |
| Wt. % of silica in alumina | | 5 | 3 | 5 | 10 | 5 | 10 | 20 | 40 | 5 |
| Properties of aluminas | Crushing strength (kg/cm$^2$) | | 7.1 | 5.3 | 6.3 | 8.4 | 9.1 | 10.6 | 12.6 | |
| | Surface (m$^2$/g) | 418 | 401 | 380 | 380 | 344 | 398 | 275 | 390 | 422 |
| | Pore volume (cc/g) | 0.96 | 1.2 | 1.55 | 1.95 | 1.35 | 1.17 | 0.93 | 1.03 | 1.98 |
| | Mode of distribution of pore radius (Å) | 44 | 63–99 | 68–100 | 68–98 | 45 | 37–80 | 43 | 29–46 | 100 |
| | Distribution of pore volume (%) Pore radius (Å): | | | | | | | | | |
| | ≦10 | 0 | 0 | 0 | 0 | 0 | 0 | 0 | 0 | 0 |
| | 11 to 20 | 14.5 | 9.8 | 2.9 | 8.1 | 13.4 | 5.2 | 10.9 | 12.9 | 3.8 |
| | 20 to 30 | 14.9 | 9.3 | 2.6 | 7.3 | 12.7 | 8.1 | 14.6 | 11.4 | 4.3 |
| | 30 to 40 | 22.9 | 14.7 | 2.3 | 6.0 | 23.0 | 19.1 | 24.7 | 19.8 | 4.1 |
| | 40 to 50 | 27.9 | 16.7 | 2.8 | 8.6 | 34.8 | 14.2 | 35.8 | 49.9 | 5.8 |
| | 50 to 60 | 16.4 | 20.9 | 3.4 | 10.0 | 11.5 | 14.3 | 7.8 | 4.2 | 8.2 |
| | 60 to 70 | 1.5 | 15.8 | 49.2 | 14.5 | 2.8 | 10.0 | 2.7 | 1.2 | 9.2 |
| | 70 to 80 | 0.8 | 7.2 | 7.9 | 7.9 | 1.4 | 16.9 | 1.5 | 0.6 | 8.5 |
| | 80 to 90 | 0.6 | 4.6 | 5.7 | 7.5 | 0.4 | 8.4 | 1.0 | 0 | 9.0 |
| | 90 to 100 | 0.4 | 1.0 | 5.7 | 9.0 | 0 | 0.4 | 0.5 | 0 | 11.5 |
| | 100 to 110 | 0.1 | 0 | 4.0 | 4.4 | 0 | 0.4 | 0.4 | 0 | 7.8 |
| | 110 to 120 | 0 | 0 | 2.6 | 2.8 | 0 | 0.5 | 0.1 | 0 | 9.5 |
| | 120 to 130 | 0 | 0 | 2.0 | 3.6 | 0 | 0.5 | 0 | 0 | 5.7 |
| | 130 to 140 | 0 | 0 | 1.8 | 4.3 | 0 | 0.5 | 0 | 0 | 3.2 |
| | 140 to 150 | 0 | 0 | 2.6 | 5.0 | 0 | 0.5 | 0 | 0 | 2.7 |
| | ≧150 | 0 | 0 | 4.5 | 1.0 | 0 | 1.0 | 0 | 0 | 6.7 |

As is apparent from Table 4, the aluminas containing silica, and particularly the aluminas D4, D5, D6 and D7, have good pore-radius distribution and good mechanical strength.

It should be noted that in the case of these aluminas the extrusion was effected in the absence of nitric acid.

It will be noted that comparable mechanical-strength values may be obtained with aluminas which contain no silica. (The alumina A11 in Table 1 has a crushing strength of 9.4 kg/cm$^2$.) This may be secured by increasing the percentage of acid during extrusion, but at the expense of surface area. (The alumina A11 has a surface area of only 274 m$^2$/g whereas the aluminas D1 to D7 have surface areas ranging from 350 to 400 m$^2$/g.)

(5) Aluminas E1 and E2

These aluminas are prepared in the same manner as the aluminas C1 and C2.

However, tetraethyl orthosilicate is added, along with the alcohol, during the rewetting.

Table 5 which follows gives, for the aluminas E1 and E2, the quantities of xerogel, alcohol and tetraethyl orthosilicate used in rewetting the xerogels, the specific surface, pore volume and pore radius, the percentage of silica in the aluminas obtained, as well as the distribution of the pore volume.

TABLE 5

| | ALUMINA | E1 | E2 |
|---|---|---|---|
| Rewetting | Weight of xerogel (g) | 40 | 60 |
| | Volume of alcohol (cc) | 84 | 100 |
| | Weight of tetraethyl orthosilicate (g) | 5.1 | 7.65 |
| Wt. % of silica in alumina | | 5.44 | 5.66 |
| Properties of aluminas | Specific surface (m$^2$/g) | 353 | 478 |
| | Pore Volume (cc/g) | 1.3 | 1.38 |
| | Mode of distribution of pore radius (Å) | 65–83 | 58 |
| | Distribution of pore volume (%) Pore radius (Å): | | |
| | ≦10 | 0 | 0 |
| | 11 to 20 | 3.7 | 6.0 |
| | 20 to 30 | 3.3 | 5.1 |
| | 30 to 40 | 3.6 | 7.9 |
| | 40 to 50 | 4.1 | 25.8 |
| | 50 to 60 | 6.8 | 24.9 |
| | 60 to 70 | 52.2 | 15.2 |
| | 70 to 80 | 12.0 | 6.4 |
| | 80 to 90 | 9.2 | 2.7 |
| | 90 to 100 | 1.1 | 1.8 |
| | 100 to 110 | 0.9 | 1.2 |
| | 110 to 120 | 0.8 | 1.0 |
| | 120 to 130 | 0.7 | 0.8 |
| | 130 to 140 | 0.6 | 0.5 |
| | 140 to 150 | 0.5 | 0.5 |

TABLE 5-continued

| ALUMINA | E1 | E2 |
|---|---|---|
| ≦150 | 0.5 | 0.2 |

The mesoporosity of the aluminas obtained is apparent from that table.

(6) Aluminas TF1 and F1

The gel is prepared in the same manner as in the case of alumina C1.

The gel is washed with water and then with acetone. It is then dried for 16 hr. at 120° C. A xerogel is thus obtained, and from this the aluminas TF1 and F1 are prepared.

(a) Preparation of TF1

150 g of xerogel is rewetted with 69 cc of water containing 20.1 g of tetraethyl orthosilicate. It is then extruded and calcined for 2 hr at 600° C. The alumina TF1 contains 5% by weight of silica.

(b) Preparation of F1

100 g of xerogel is rewetted with 174 cc of ethanol containing 13.17 g of tetraethylorthosilicate. It is then extruded and calcined for 2 hr at 600° C. The alumina F1 contains 5% by weight of silica.

(c) Properties of TF1 and F1

These properties are given in Table 6 which follows.

TABLE 6

| ALUMINA | TF1 | F1 |
|---|---|---|
| Surface (m²/g) | 344 | 377 |
| Pore volume (cc/g) | 0.43 | 1.16 |
| Mode of distribution of pore radius (Å) | 20 | 57 |
| Distribution of pore volume (%) | | |
| Pore radius (Å): | | |
| ≦10 | 0 | 0 |
| 10 to 20 | 76.1 | 9.7 |
| 20 to 30 | 15.2 | 9.0 |
| 30 to 40 | 3.5 | 16.5 |
| 40 to 50 | 1.8 | 16.0 |
| 50 to 60 | 0.9 | 22.7 |
| 60 to 70 | 0.7 | 17.8 |
| 70 to 80 | 0.6 | 4.6 |
| 80 to 90 | 0.5 | 2.2 |
| 90 to 100 | 0.4 | 0.6 |
| 100 to 110 | 0.3 | 0.9 |
| 110 to 120 | 0 | 0 |
| 120 to 130 | 0 | 0 |
| 130 to 140 | 0 | 0 |
| 140 to 150 | 0 | 0 |
| ≧150 | 0 | 0 |

This table points up the mesoporosity of the alumina F1.

EXAMPLE 2

This example relates to the preparation of control catalysts TG1 and TG2 and of catalysts G1, G2 and G3 in accordance with the invention.

These catalysts are produced by the use of the carriers prepared in example 1.

A quantity of carrier is impregnated with an ethyl alcohol solution of molybdenum acetylacetonate and cobalt nitrate. They are allowed to remain in contact for 24 hr, whereupon the alcohol is evaporated. This is followed by drying for 16 hr. at 120° C. and by calcining for 2 hr. at 550° C.

The quantities of carrier and the compositions of the impregnating solutions and of the catalysts obtained are given in Table 7 which follows.

TABLE 7

| | | | Composition of impregnating solution | | | Composition of catalyst (wt. %) | |
|---|---|---|---|---|---|---|---|
| Catalyst | Carrier | Weight of carrier (g) | Alcohol (cc) | Cobalt nitrate (g) | Molybdenum acetylacetonate (g) | MoO₃ | CoO |
| TG1 | TD1 | 40 | 250 | 6.8 | 23 | 19.3 | 3.4 |
| G1 | D8 | 21 | 200 | 2.8 | 9.3 | 16 | 2.8 |
| G2 | D8 | 20 | 300 | 7.9 | 26.5 | 35 | 6.1 |
| TG2 | TF1 | 69 | 250 | 11.8 | 39.6 | 19.6 | 3.4 |
| G3 | F1 | 33 | 250 | 5 | 16.5 | 17.5 | 3.1 |

EXAMPLE 3

This example relates to hydrodesulfurization tests run on a charge of hydrocarbons with the catalysts prepared in example 2.

The charge consists of a vacuum gas oil derived from a Safaniya petroleum. Its characteristics are as follows:
Gravity at 15° C.: 0.919
Viscosity (210° F.=99° C.): 6.14 cst
Distillation range: 331° to 521° C.
 (50% distilled point: 429° C.)
Sulfur content: 2.82%

A 50 cc reactor is filled with catalyst, which is presulfurized by means of a mixture of hydrogen and sulfurized hydrogen (10% by volume of $H_2S$) at 400° C. and 30 bars for 2 hr.

The testing conditions are as follows:
Space velocity: 1
$H_2$/hydrocarbon ratio: 425 std liters/liter
Duration of tests: 24 hr.

The conditions of temperature and pressure vary from test to test.

The results of the tests are evaluated on the basis of the weight of sulfur removed per unit weight of catalyst. These results are presented in Table 8 which follows.

TABLE 8

| Test No. | Catalyst | Operating conditions | | Weight of sulfur removed (mg/g of catalyst) |
|---|---|---|---|---|
| | | Pressure (bars) | Temperature (°C.) | |
| 1 | | 50 | 400 | 41.4 |
| 2 | TG1 | 50 | 350 | 36.4 |
| 3 | | 20 | 350 | 30.6 |
| 4 | | 20 | 400 | 38.7 |
| 5 | | 50 | 400 | 85.0 |
| 6 | G1 | 50 | 350 | 63.2 |
| 7 | | 20 | 350 | 54.5 |
| 8 | | 20 | 400 | 79.4 |
| 9 | | 50 | 400 | 65.5 |
| 10 | G2 | 50 | 350 | 62.9 |
| 11 | | 20 | 350 | 54.2 |
| 12 | | 20 | 400 | 44.5 |

TABLE 8-continued

| Test No. | Catalyst | Operating conditions | | Weight of sulfur removed (mg/g of catalyst) |
|---|---|---|---|---|
| | | Pressure (bars) | Temperature (°C.) | |
| 13 | | 50 | 400 | 31.6 |
| 14 | TG2 | 50 | 350 | 30.1 |
| 15 | | 20 | 350 | 14.2 |
| 16 | | 20 | 400 | 21.3 |
| 17 | | 50 | 400 | 58.4 |
| 18 | G3 | 50 | 350 | 45.7 |
| 19 | | 20 | 350 | 39.5 |
| 20 | | 20 | 400 | 55.4 |

It is apparent from this table that the catalysts obtained by the use of the aluminas prepared by the process in accordance with the invention are very much more active than those produced with carriers extruded in the absence of alcohol.

I claim:

1. In a process for the preparation of aluminas with controlled porosity comprising
   (a) precipitation of an alumina gel from a solution of an aluminum salt;
   (b) washing of the gel, as required;
   (c) at least partial drying of the alumina gel;
   (d) rewetting of the dried alumina, if required;
   (e) thereafter forming the alumina by extrusion;
   (f) calcinating of the extrudates obtained; the improvement to said process comprising effecting the extrusion of the alumina in the presence of an alcohol.

2. Process as defined in claim 1, wherein said alcohol is selected from the group consisting of ethanol, methanol, the propanols and the butanols.

3. Process as defined in claim 2, wherein the quantity of alcohol contained in the alumina upon extrusion is not less than 20% by weight of the solid matter.

4. Process as defined in claim 2, wherein the quantity of alcohol contained in the alumina upon extrusion is not less than 50% by weight of the solid matter.

5. Process as defined in claim 3, further comprising said alumina gel being obtained by reaction of sodium aluminate and aluminum chloride.

6. Process as defined in claim 3, further comprising said alumina gel being obtained by reaction of aluminum nitrate and ammonia.

7. Process as defined in claim 3, further comprising said alumina gel being obtained by reaction of aluminum chloride and ammonia.

8. Process as defined in claim 3, further comprising following the washing of the alumina gel with water by washing with a compound selected from the group consisting of the alcohols and the ketones.

9. Process as defined in claim 3, further comprising drying the alumina gel at a temperature between 40 and 140° C. until a gel is obtained which contains 15 wt. % or more of solid matter.

10. Process as defined in claim 3, further comprising drying the alumina gel at a temperature between 40° and 140° C. until a xerogel containing from 60 to 90 wt. % of solid matter is obtained.

11. Process as defined in claim 3, further comprising calcining the alumina gel at a temperature of 300° C. or higher.

12. Process as defined in claim 3, wherein the precipitation of the alumina gel is effected in the presence of an alcohol.

13. Process as defined in claim 9, wherein following drying the alumina is rewetted with a liquid at least partially consisting of an effective amount of an alcohol.

14. Process as defined in claim 10, wherein following calcination the alumina is rewetted with a liquid at least partially consisting of an effective amount of alcohol.

15. Process as defined in one of claims 1 to 12, wherein the calcination of step (f) is effected at a temperature of not less than 300° C.

16. Process for the preparation of aluminas as defined in one of claims 1 to 12, wherein during the extrusion of the alumina a silicon compound is incorporated therein which compound is then converted to silica.

17. Process as defined in claim 16, wherein the silicon compound is tetraethyl orthosilicate.

18. Process as defined in claim 2 wherein said alcohol is ethanol.

19. Alumina prepared by a process as defined in claims 1, 3 or 18.

20. Catalysts for the conversion of hydrocarbons coprising one active phase in the form of at least one metal from groups III to VIII of the Periodic Table combined with a carrier made of an alumina as defined in claim 19.

21. Catalyst as defined in claim 20 for the hydrodesulfurization of hydrocarbons and the active phase comprises at least one metal from groups VIB and VIII of the Periodic Table.

22. Alumina according to claim 19 wherein during the extrusion step of said process, a silicon compound is incorporated in said alumina, which compound is then converted to silica.

23. Alumina according to claim 22, wherein said silicon compound is tetraethyl ortho silicate.

24. Catalysts for the conversion of hydrocarbons comprising one active phase in the form of at least one metal from groups III to VIII of the Periodic Table combined with a carrier made of an alumina as defined in claim 22.

25. Catalyst as defined in claim 24, for the hydrodesulfurization of hydrocarbons, wherein the active phase comprises at least one metal from groups VIB and VIII of the Periodic Table.

26. Catalysts for the conversion of hydrocarbons comprising one active phase in the form of at least one metal from groups III to VIII of the Periodic Table combined with a carrier made of an alumina as defined in claim 23.

27. Catalyst as defined in claim 26, for the hydrodesulfurization of hydrocarbons, wherein the active phase comprises at least one metal from groups VIB and VIII of the Periodic Table.

* * * * *